(12) United States Patent
Jeong

(10) Patent No.: US 6,404,624 B1
(45) Date of Patent: Jun. 11, 2002

(54) STRUCTURE FOR MOUNTING ELECTRONIC DEVICES TO A COMPUTER MAIN BODY

(75) Inventor: Kyu-Yeob Jeong, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 32 days.

(21) Appl. No.: 09/592,536

(22) Filed: Jun. 12, 2000

(30) Foreign Application Priority Data

Jun. 11, 1999 (KR) .............................................. 99/21790

(51) Int. Cl.[7] ................................................. G06F 1/16
(52) U.S. Cl. ........................ 361/683; 361/685; 361/724; 312/223.2
(58) Field of Search ................................ 361/679, 683, 361/684, 685, 686, 724–733, 735–737, 740–742, 747, 748, 752, 753, 756, 759; 312/223.1, 223.2; 439/61, 62, 64

(56) References Cited

U.S. PATENT DOCUMENTS

| | | | |
|---|---|---|---|
| 5,031,070 A | 7/1991 | Hsu | |
| 5,138,525 A | 8/1992 | Rodriguez | |
| 5,269,598 A | 12/1993 | Liu | |
| 5,338,214 A | 8/1994 | Steffes et al. | |
| 5,519,573 A | * 5/1996 | Cobb et al. | .................. 361/686 |
| 5,768,097 A | 6/1998 | Jelinger | |
| 5,768,099 A | 6/1998 | Radloff et al. | |
| 5,947,570 A | 9/1999 | Anderson et al. | |
| 6,052,277 A | * 4/2000 | Liu et al. | .................... 361/685 |
| 6,055,152 A | 4/2000 | Felcman et al. | |

* cited by examiner

Primary Examiner—Darren Schuberg
Assistant Examiner—Yean H Chang
(74) Attorney, Agent, or Firm—Robert E. Bushnell, Esq.

(57) ABSTRACT

A structure for mounting electronic devices to a main body of a computer is disclosed. The structure has a chassis, a first device holder, a second device holder and a strut. The chassis has a first vertical plate, a second vertical plate and a bottom connecting the first and second vertical plates to each other. The first device holder is positioned in the chassis and near the first vertical plate. The second device holder is positioned in the chassis, near the first vertical plate and parallel with the first device holder. The strut is secured to the first vertical plate at its first end and to the second vertical plate at its second end while traversing over the chassis, and is engaged with and retains the first and second device holders.

21 Claims, 14 Drawing Sheets

STRUCTURE FOR MOUNTING ELECTRONIC DEVICES TO A COMPUTER MAIN BODY

This application makes reference to, incorporates the same herein, and claims all benefits accruing under 35 U.S.C. §119 from an application entitled Computer with a Strut for Supoorting Electronic Devices earlier filed in the Korean Industrial Property Office on Jun. 11, 1999, and there duly assigned Ser. No. 99-21790 by that Office.

BACKGROUND OF THE INVENTION

1. Field of the Invention

The present invention relates, in general, to computers and, more particularly, to a structure for mounting electronic devices, such as a disk drive or an electronic card, to a computer main body.

2. Description of the Background Art

Most kinds of computers have one or more computer disk drives. Such computer disk drives are generally mounted to the computer chassis of a computer's main body. Generally employed disk drives are for example floppy disk drives for 3.5-inch floppy disks and CD-ROM (Compact Disc-Read Only Memory) drives for CD-ROMs. Each one of the disk drives has a housing that contains a plurality of component elements and is mounted to a chassis of a computer's main body.

When a floppy disk drive and a CD-ROM drive are both installed in a computer's main body, one mounting technique positions both in the same space within a chassis. The disk drives are retained using a plurality of different holders and brackets that are positioned in the interior of a chassis. Consequently, the number of parts for mounting the disk drives to the chassis is increased, and work for mounting the disk drives to the chassis is complex and difficult.

In addition, the computer is generally provided with one or more electronic cards that are inserted into a mother board on the bottom of the chassis. The computer is packed in a container and conveyed in a state where the electronic cards are mounted into the mother board. Therefore, during the packing and conveyance of the computer, the electronic cards may be damaged by impact or vibration load. In order to solve this problem, a technique is required to securely retain the electronic cards in the interior of the chassis, thus preventing the cards from being damaged by impact or vibration load.

An exemplar of the background art is U.S. Pat. No. 5,138,525 for Multi-purpose Strut for Digital Computer Chassis issued to Rodriguez discloses a strut fastening both the front and rear walls to strengthen the chassis. U.S. Pat. No. 5,768,099 for Computer with an Improved Disk Drive Mounting Assembly issued to Radloff et al., U.S. Pat. No. 5,031,070 for Structure of Computer Housing issued to Hsu, U.S. Pat. No. 6,052,277 for Computer Enclosure issued to Liu et al., U.S. Pat. No. 5,269,598 for Personal Computer Component Support issued to Liu, U.S. Pat. No. 5,947,570 for Modular Cabinet Assembly for a Computer issued to Anderson et al., U.S. Pat. No. 5,768,097 for Reconfigurable Modular Computer Assembly having a Main Chassis with a Removably Attached Face Plate and at Least One Spacer Removably Attached to the Face Plate issued to Jelinger, U.S. Pat. No. 5,338,214 for Expansion Card/Riser Card Module for Desktop Computers issued to Steffes et al, and U.S. Pat. No. 6,055,152 for Modular Computer Apparatus issued to Felcman et al disclose mounting structures for personal computer systems.

I have found that the background art does not show a structure for mounting electronic devices in a computer that reduces the number of parts used and provides extra protection from vibration and impact for the electronic devices.

SUMMARY OF THE INVENTION

The present invention has been made to overcome the above described problems of the background art, and accordingly, it is an object of the present invention to provide a structure for mounting electronic devices to a computer's main body, which allows work for mounting the devices to be simplified and facilitated.

It is another object to provide a structure for mounting electronic devices to a computer main body, which is capable of reducing the number of parts for mounting the devices to a computer main body.

It is a further object to provide a structure for mounting electronic devices to a computer main body, which is capable of securely retaining electronic cards in the interior of a chassis.

It is yet another object to provide an electronic devices mounting structure of computer's main body that can protect the electronic devices from outside impact.

In order to accomplish the above object, the present invention provides a structure for mounting electronic devices to a computer's main body including a chassis having a first vertical plate, a second vertical plate and a bottom connecting the first and second vertical plates to each other, a first device holder positioned in the chassis and near the first vertical plate, a second device holder positioned in the chassis, near the first vertical plate and parallel with the first device holder, and a strut being fixed to the first vertical plate at its first end and to the second vertical plate at its second end while traversing over the chassis, and being engaged with and retaining the first and second device holders.

The structure may further have a riser socket mounted to a computer mother board and a riser card inserted to the riser socket and retained by the strut at its upper portion. The riser card may be retained by a clip having a channel, which is provided on one side of the strut. The strut may be provided with one or more screw holes on both sides of the clip and the riser card may be provided with screw holes corresponding to the screw holes of the strut, so as to fasten the riser card by means of screws. The structure may further include a bracket being secured to the first vertical plate between the first and second device holders and supporting the strut beneath the strut.

The first vertical plate may be provided with a first flange extended horizontally and inwardly from the top edge of the first vertical plate and provided with holes, the bracket may be provided with a projection, and a first end of the strut may be provided with projections inserted into the holes of the first flange and a hole engaged with the projection of the bracket.

The second vertical plate may be provided with a second flange extended horizontally and inwardly from the top edge of the second vertical plate and provided with screw holes, and a second end of the strut secured to the second flange may be provided with holes corresponding to the screw holes of the second flange.

The first device holder may hold a hard disk drive and a floppy disk drive. The second device holder may hold a CD-ROM drive. The chassis may be open at its top, and the strut may be secured to the centers of the tops of the first and second vertical plates of the chassis while being extended parallel to the top of the chassis.

In addition, the present invention provides another structure for mounting electronic devices to a computer's main body, including a chassis having sidewalls, at least one device holder positioned in the chassis, and a strut being fixed to the sidewalls at its both ends while traversing over the chassis, and being engaged with and retaining the device holder.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
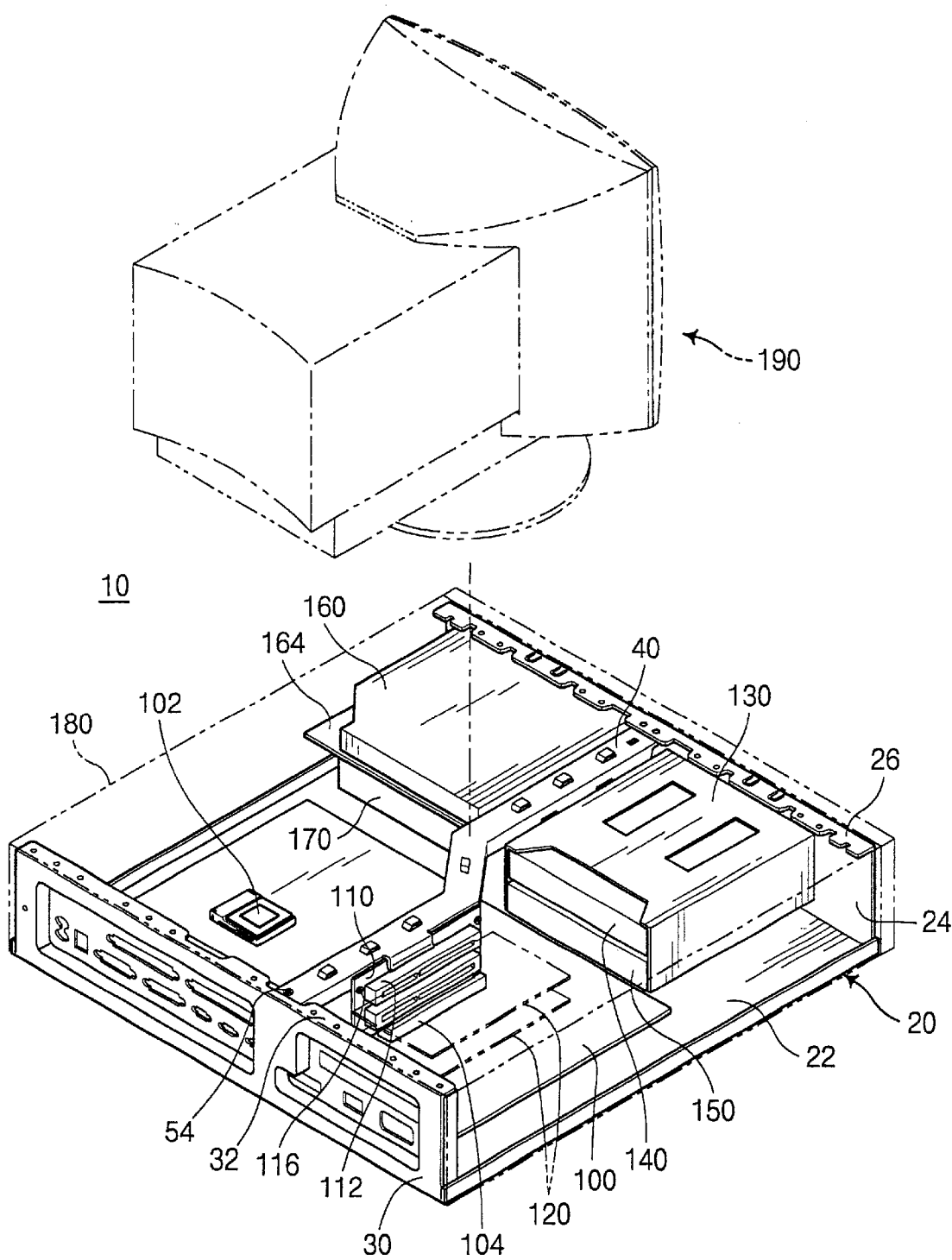
FIG. 1 is a perspective view for explaining the interior structure of a computer's main body according to an embodiment of the present invention.

Turning now to the drawings, FIG. 1 shows a computer 10 of the present invention that may be a desktop, laptop or tower computer. The computer 10 includes a chassis 20 to which a motherboard 100 is mounted at the bottom of the chassis 20. A central processing unit 102, a plurality of memory devices or modules (not shown) and input/output devices (not shown) are mounted to the motherboard 100. Furthermore, a plurality of buses (not shown) that respectively interconnect the central processing unit 102, the memory devices or modules, and input/output devices are mounted. A power supply 170 is connected to the motherboard 100 and cables (not shown) that are respectively connected to a hard disk drive 140, a floppy disk drive 150 and a CD-ROM drive 160. A riser card 110 having horizontal sockets 112 for horizontally receiving expansion cards 120 is inserted into a riser card socket 104. It should be understood that other electronic components (not shown), such as electric wires, electric circuits and associated devices, are mounted to the chassis 20 additionally.

The mounting of electronic devices to a computer main body is performed by mounting the above described components to the interior of the chassis 20 and, subsequently, allowing a first drive holder 130 holding the hard disk drive 140 and the floppy disk drive 150, the CD-ROM disk drive and the riser card 110 to be retained by a strut 40 that is mounted to the top of the chassis 20. A cover 180 is placed on the chassis 20, thus enclosing the chassis 20. Generally, a monitor 190 is used while being positioned on the upper surface of the cover 180. The strut 40 supports the monitor 190, reinforces the strength of chassis 20, and retains the first drive holder 130, the CD-ROM drive 160 and the riser card 110.

Figure 2A:
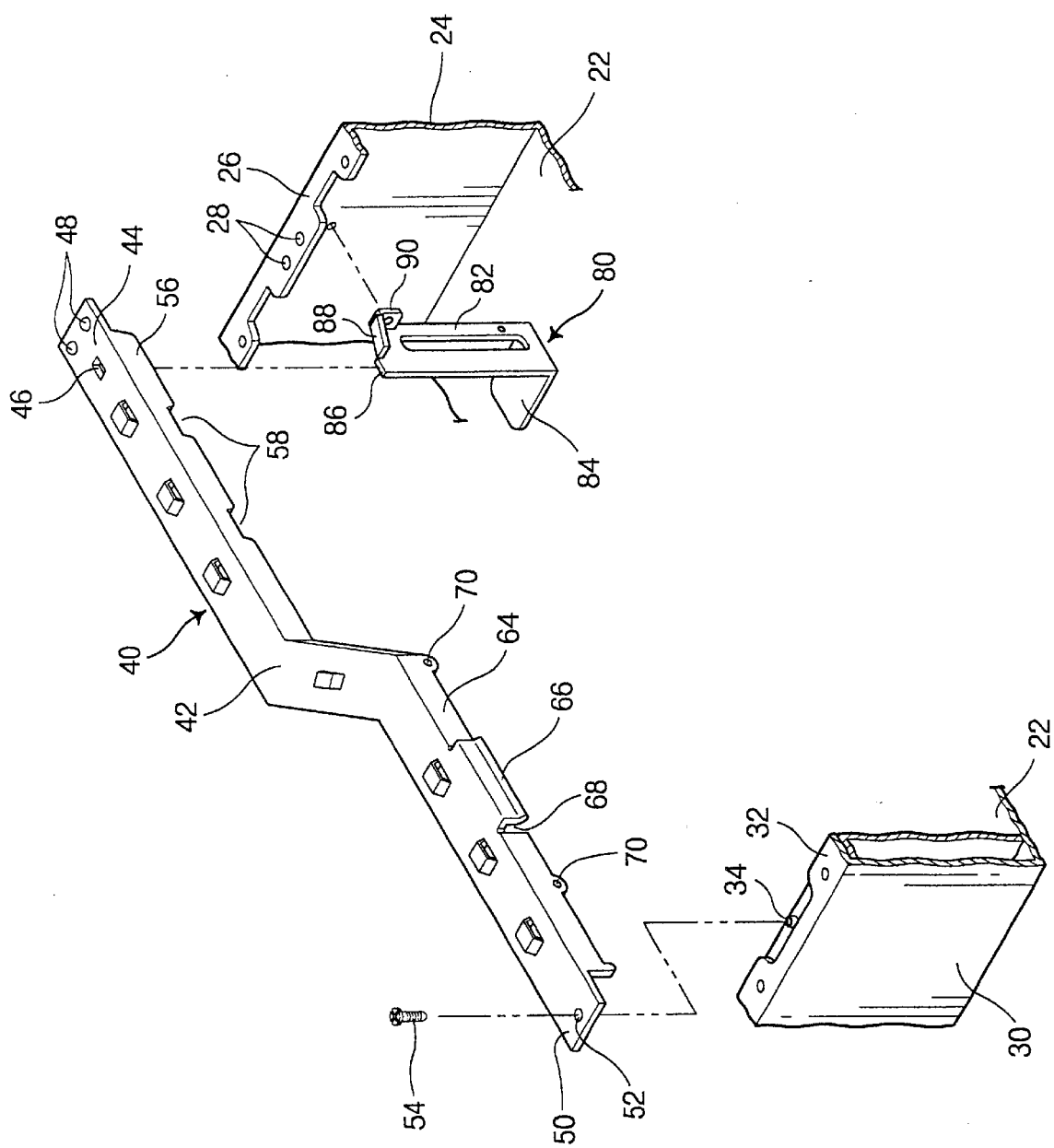
FIGS. 2A and 2B are exploded perspective views showing the strut, the strut supporting bracket and the first and second vertical plates of FIG. 1 in detail.
Figure 2B:
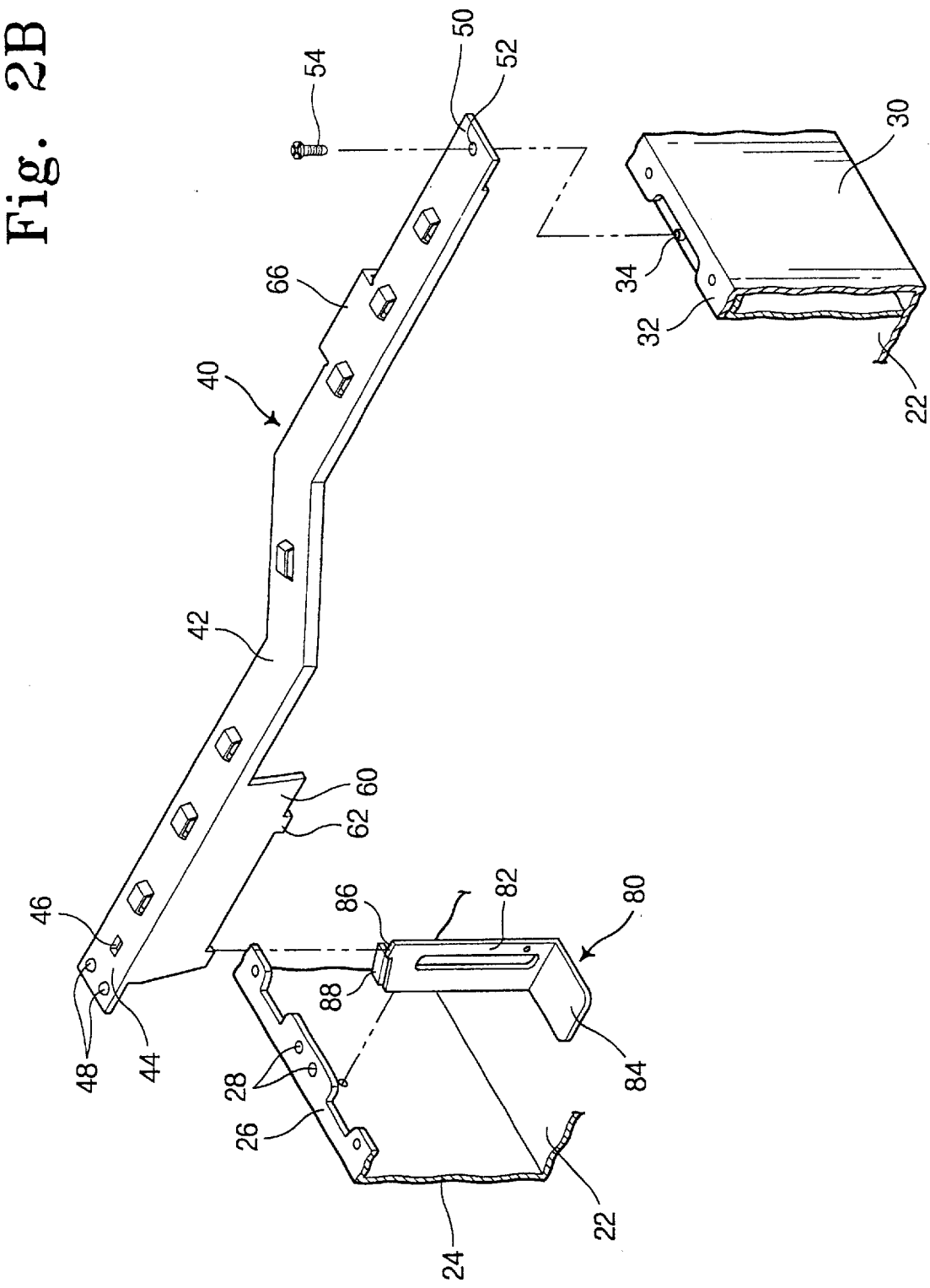

Referring FIGS. 2A and 2B, the computer of the present invention is provided with the strut 40. The strut 40 is secured to the chassis 20 with both ends of the strut 40 respectively secured to the front and rear plates 24 and 30 of the chassis 20. That is, the front end 44 of the strut 40 is secured to the front plate 24 of the chassis 20, while the rear end 50 of the strut 40 is secured to the is rear plate 30 of the chassis 20.

The chassis 20 includes a bottom 22, the front plate 24 extended from the front end of the bottom 22, and the rear plate 30 extended from the rear end of the bottom 22. Front and rear flanges 26 and 32 are inwardly and respectively extended from the front and rear plates 24 and 30 of the chassis 20. Two holes 28 for securing the front end 44 of the strut 40 are formed on the front flange 26, while a holed insert 34 is fitted into the rear flange 32. The insert 34 may be replaced with a screw hole directly formed on the rear flange 32. The insert 34 serves to secure the rear end 50 of the strut 40 to the rear flange 32 of the chassis 20 using a screw 54.

The strut 40 includes the front end 44, the rear end 50 and an intermediate portion 42 connecting the front end 44 with the rear end 50. A hole 46 and two projections 48 are formed on the front end 44 of the strut 40, and a hole 52 is formed on the rear end 50 of the strut 40. A first flange 56, a second flange 60 and a third flange 64 are respectively and downwardly extended from the intermediate portion 42 so as to retain the disk drives and the riser card 110 mounted to the chassis 20. The intermediate portion 42 may be angled with respect to the front end 44 and the rear end 50 to allow for the strut 40 to cover both the riser card 110 and the disk drives. Two recesses 58 are formed on the first flange 56 so as to be engaged with projections (described below) of the first drive holder 130 holding the hard disk drive 140 and the floppy disk drive 150. Two projections 62 are formed on the second flange 60 so as to be engaged with holes (described below) of the CD-ROM drive 160. A clip 66 having a channel 68 and two spaced holes 70 are formed on the third flange 64 so as to be engaged with the riser card 110. In particular, the strut 40 is engaged with the riser card 110 inserted into the riser card socket 104 with the upper portion of the riser card 110 inserted into the channel 68 of the clip 66. Furthermore, if necessary, screws 116 are tightened into the holes 114 (described below) of the riser card 110 and the screw holes 70 of the third flange 64, thus securing the riser card 110 to the strut 40 securely.

A bracket 80 is secured to the inside surface of the front plate 24 of the chassis 20 where the front end 44 of the strut 40 is secured. The bracket 80 is secured to the strut 40 so as to hold and support the strut 40. The bracket 80 includes a horizontal portion 84 rested on the bottom 22 of the chassis 20, a vertical portion 82 extended vertically from one end of the horizontal portion 84, and a fastening portion 90 secured to one side of the upper section of the vertical portion 82 by a rivet or other fastener. A projection 86 for being engaged with the hole 46 of the strut 40 and a guide 88 are formed on the top edge of the vertical portion 82 of the bracket 80. The top of the bracket 80 is positioned beneath the holes 28 formed in the front flange 26 of the chassis 20. The strut 40 is inserted between the bracket 80 and the front flange 26 of the chassis 20 at its front end, thereafter being secured to the chassis 20.

Figure 3A:
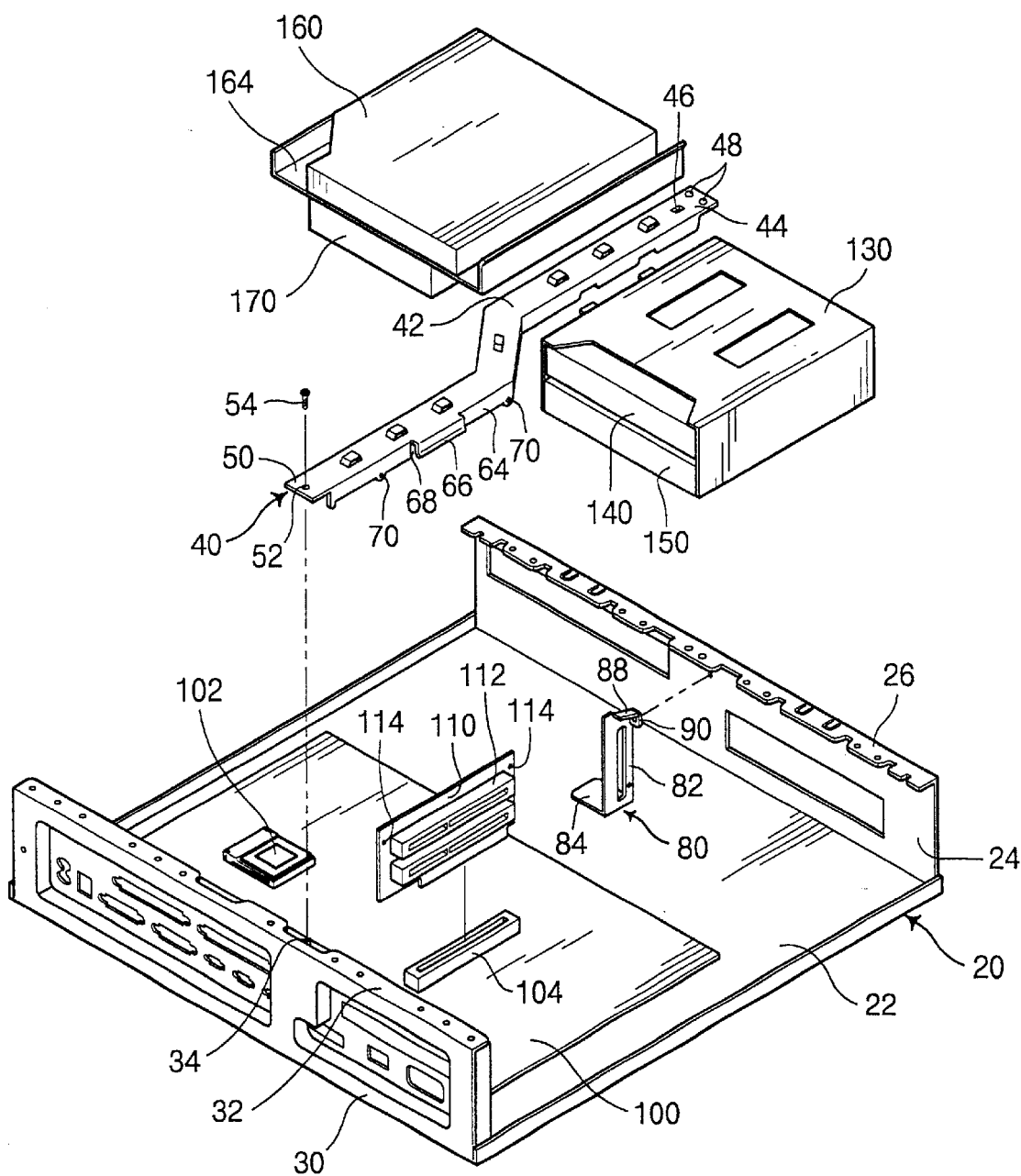
FIGS. 3A to 3C are exploded perspective views showing a process in which the strut, the bracket and the electronic devices are mounted to a chassis.
Figure 3B:
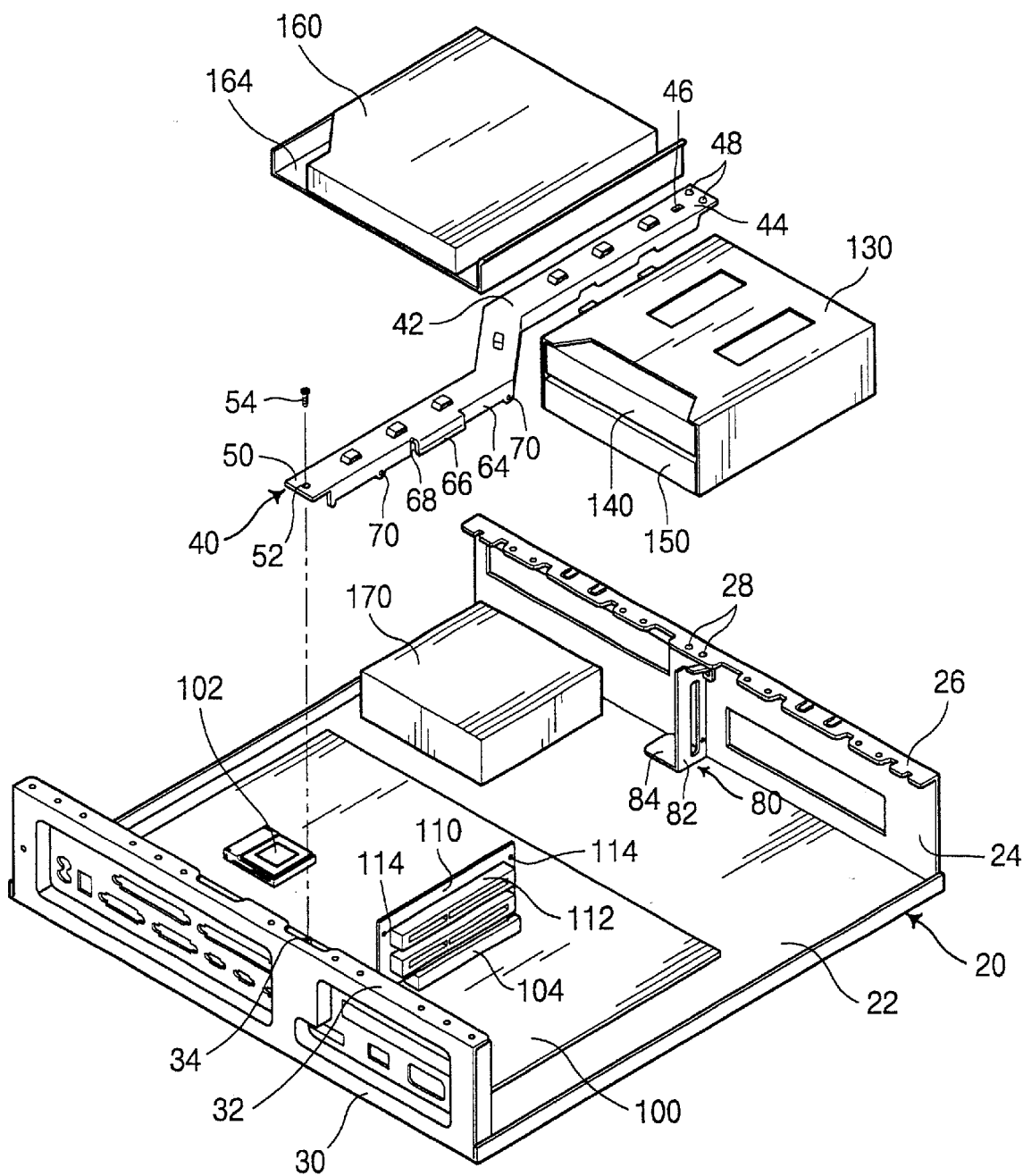
Figure 3C:
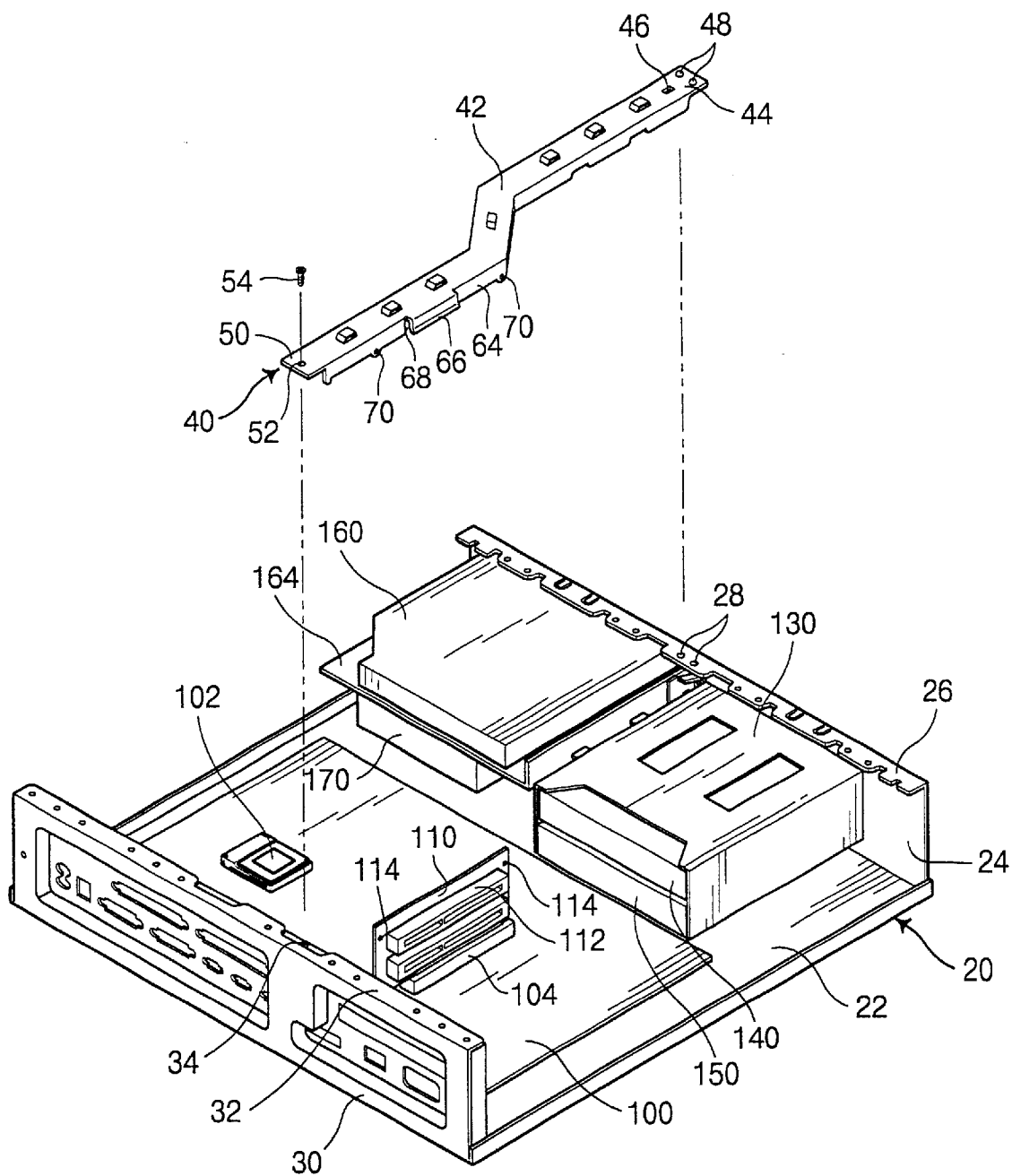

Referring to FIGS. 3A to 3C, the mounting of electronic devices to a main body of a computer is described. First of all, the bracket 80, the power supply 170, the mother board 100, the riser card 110, etc. are mounted on the chassis 20. At this stage, various expansion cards may be inserted into the riser card 110, and other devices and cables may be disposed. Subsequently, as shown in FIG. 3C, the hard disk drive 140, the floppy disk drive 150 and CD-ROM drive 160 are mounted to the chassis 20. Finally, the strut 40 is secured to the top of the chassis 20 and is allowed to retain the hard disk drive 140, the floppy disk drive 150, the CD-ROM disk drive 160 and the riser card 110. The retaining of the hard disk drive 140, the floppy disk drive 150, the CD-ROM disk drive 160 and the riser card 110 using the strut 40 may be performed in various fashions. Each of the disk drives 140, 150 and 160 generally has a housing that contains various kinds of components and is secured to the chassis 20. However, in this embodiment, the disk drives 140, 150 and 160 are held by separate holders 130 and 164. The disk drives 140, 150 and 160 are prevented by the strut 40 from being undesirably moved upward, to the front and rear and to the right and left. According to the present invention, since many parts for preventing the movement of the disk drives 140, 150 and 160 to the above directions are not required, the number of the parts for the prevention of movement can be reduced. Additionally, since the strut 40 is mounted to the chassis 20 after the other electronic devices are mounted to the chassis 20, the assembly of the computer main body can be simplified and facilitated. Further, since the riser card 110 is retained securely by the strut 40, there can be prevented the damage of the riser card 110, the mother board 100 and the expansion cards that may occur during the handling and conveyance of the computer.

Figure 4A:
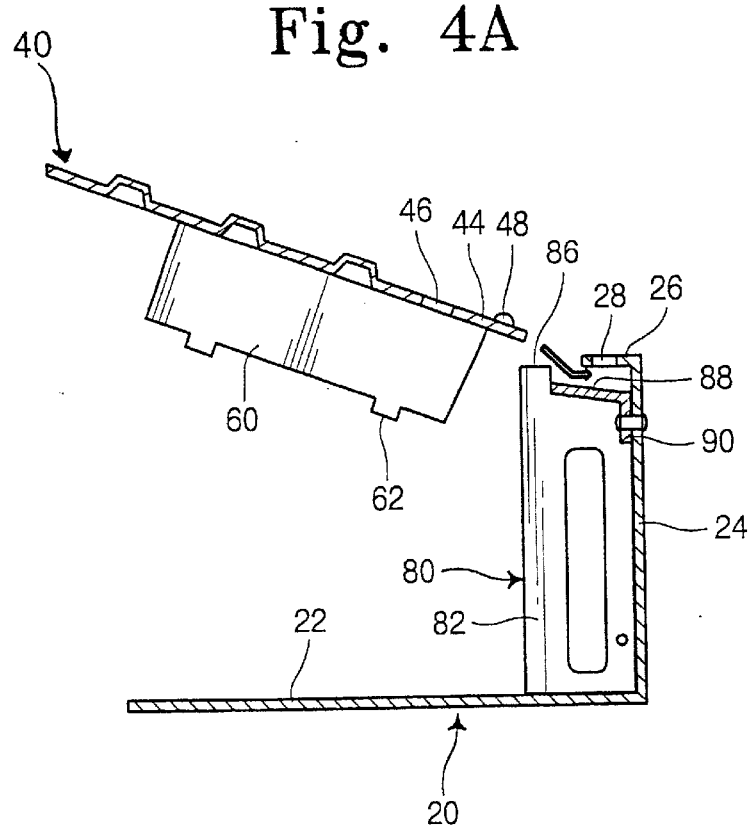
FIGS. 4A to 4C are partial side sectional views showing a process in which the strut is mounted to the chassis.
Figure 4B:
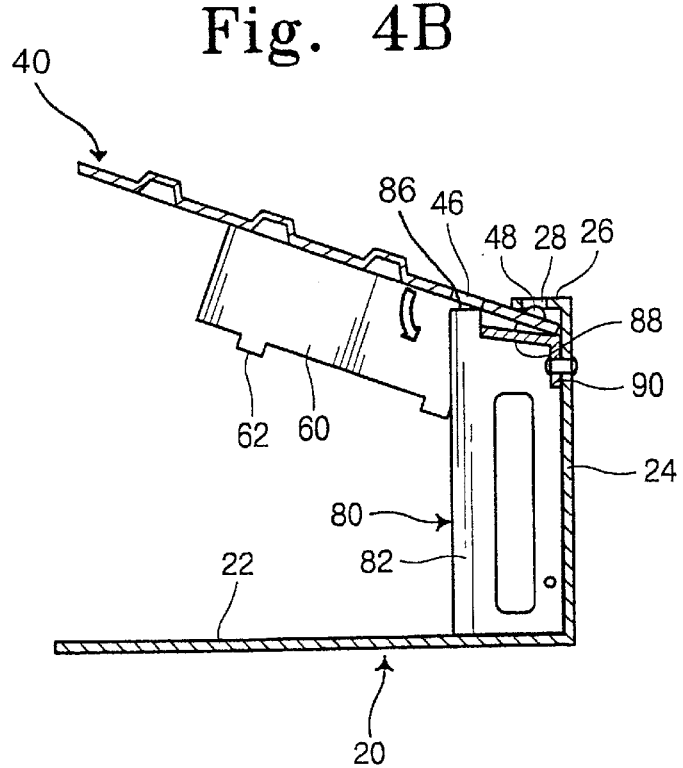

FIGS. 4A to 7B are views for explaining the mounting of the strut to a chassis. As illustrated in FIG. 4A, the front end 44 of the strut 40 is inserted between the bracket 80 and the front flange 26 of the chassis 20 along a direction as shown by the arrow of FIG. 4A. Thereafter, as shown in FIG. 4B, the strut 40 is turned down to the bottom 22 of the chassis 20 along a direction as shown by the arrow of FIG. 4B, thus being secured to the chassis 20 as shown in FIG. 4C. At this time, the projection 86 of the bracket 80 is inserted into the hole 46 formed on the front end 44 of the strut 40, while the projections 48 formed on the front end 44 of the strut 40 are inserted into the holes 28 formed on the front flange 26 of the chassis 20.

Figure 5A:
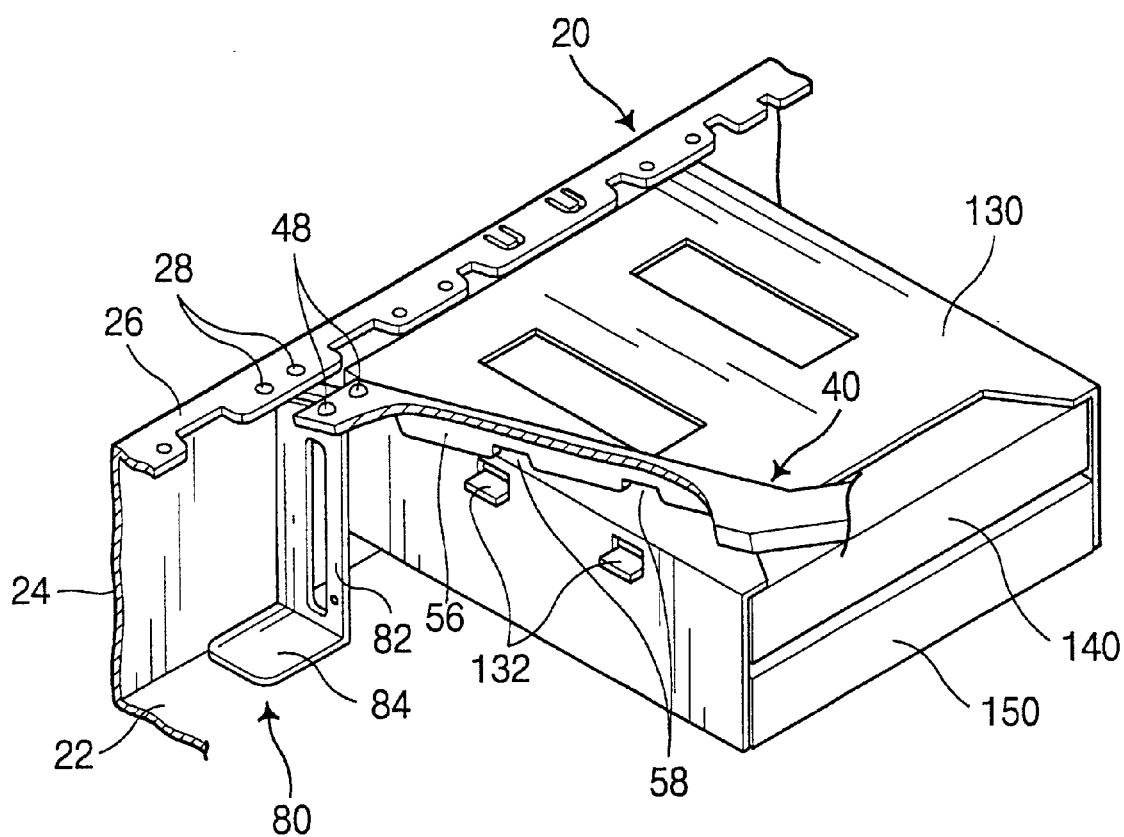
FIGS. 5A and 5B are partial cut-away perspective views showing a process in which the strut is engaged with a first device holder.
Figure 5B:
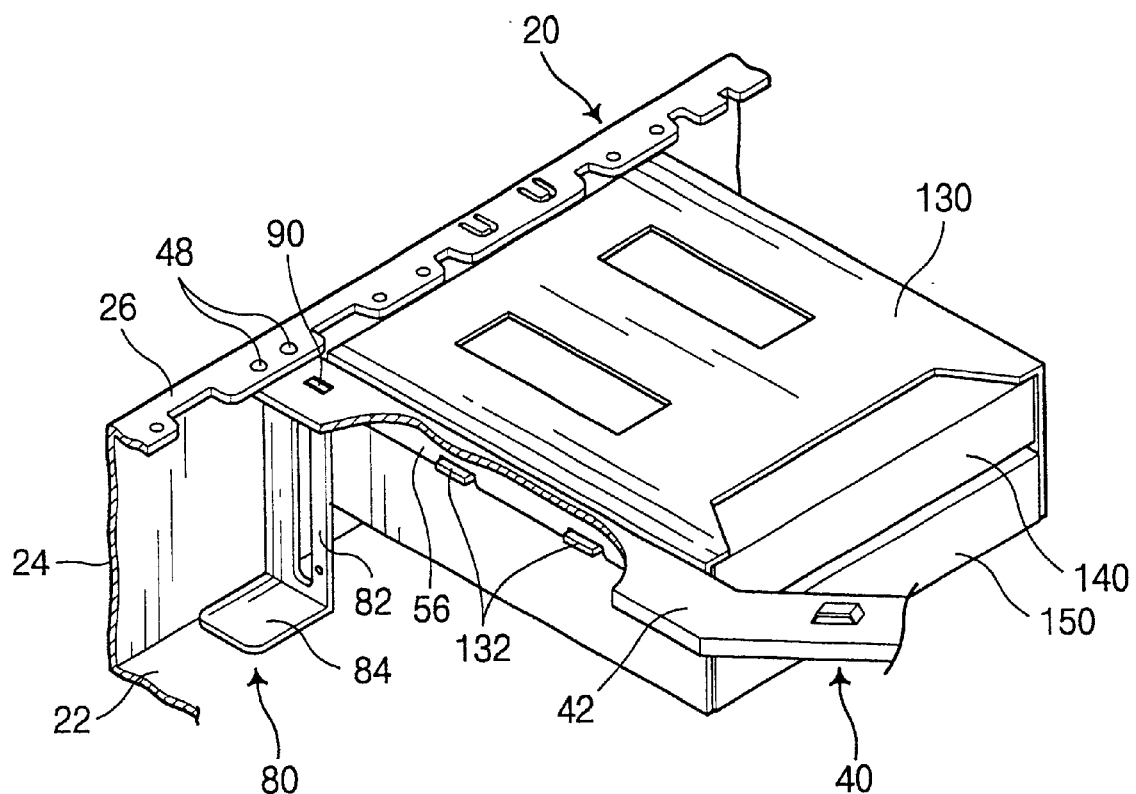
Figure 6A:
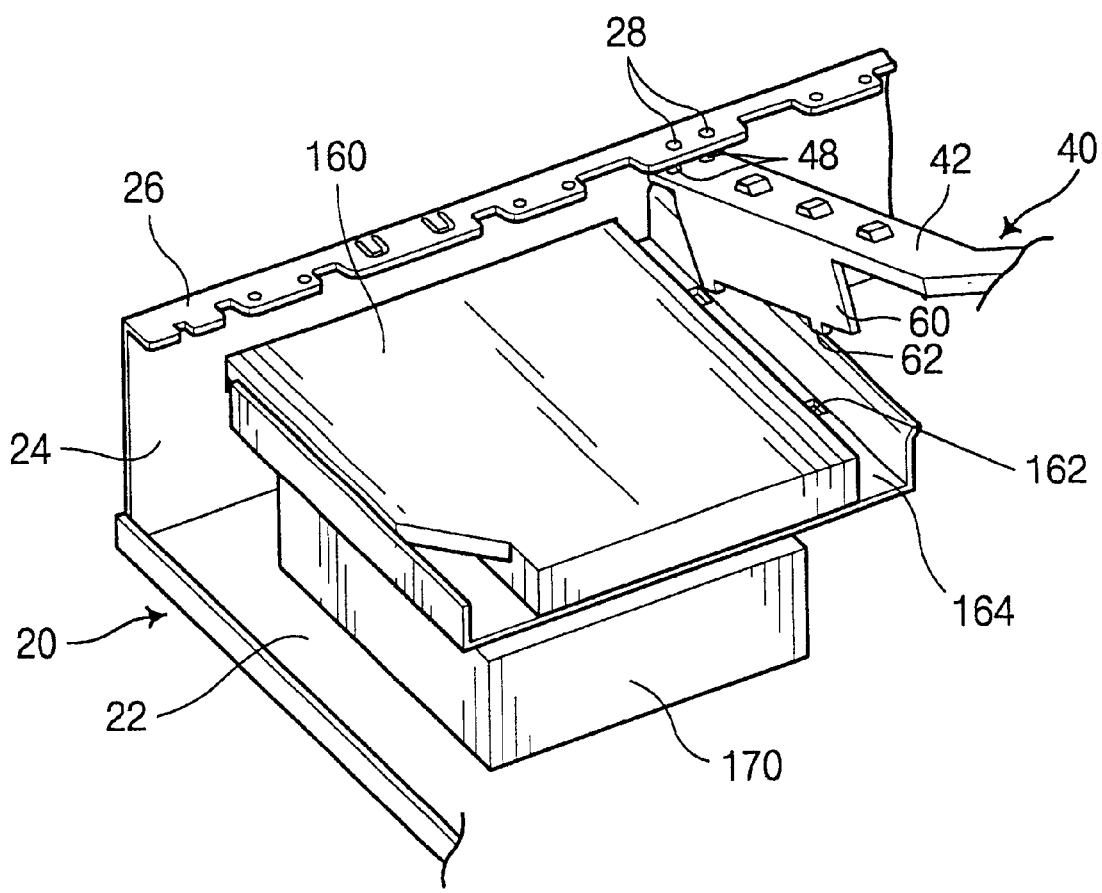
FIGS. 6A and 6B are partial cut-away perspective views showing a process in which the strut is engaged with a second device holder.
Figure 6B:
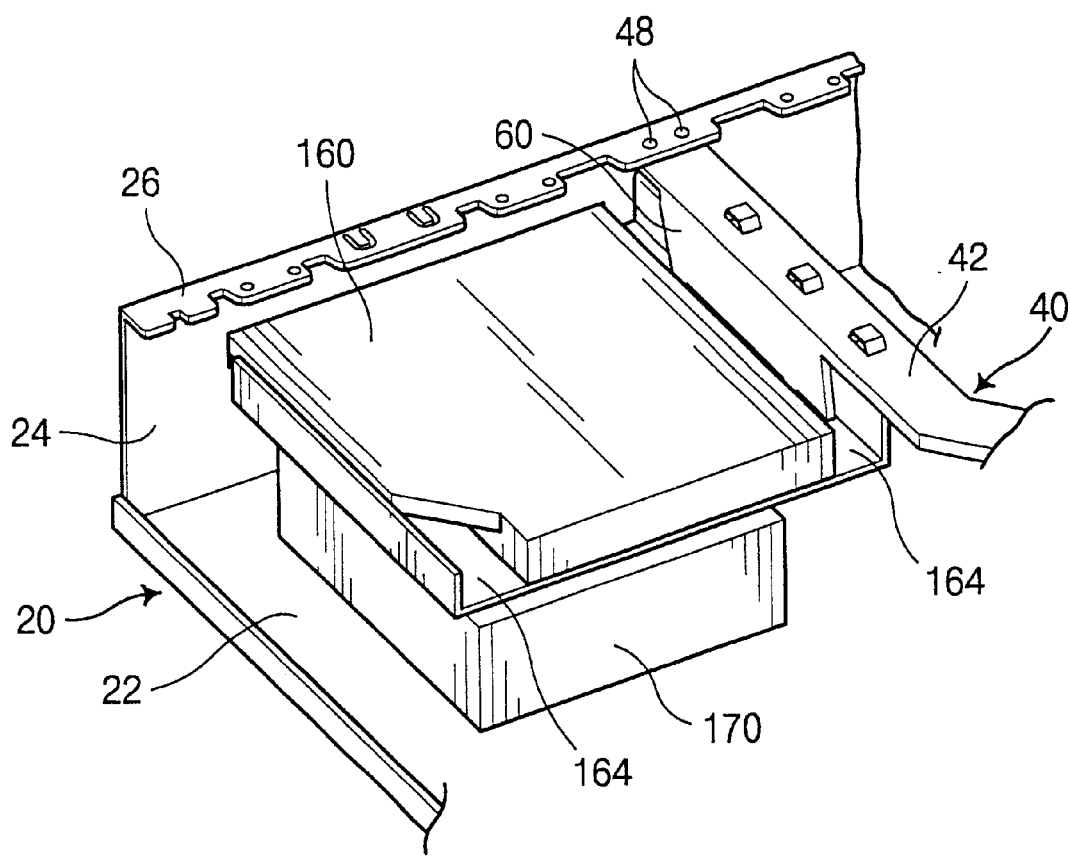

Referring to FIGS. 5A and 5B, when the front end 44 of the strut 40 is secured to the chassis 20, the first flange 56 of the strut 40 is engaged with the first drive holder 130 holding the hard disk drive 140 and the floppy disk drive 150. At this time, the recesses 58 of the first flange 56 are engaged with the projections 132 of the first drive holder 130. Due to this engagement, the first drive holder 130 is prevented from being moved upward, to the front and rear and to the right and left. In addition, as shown in FIGS. 6A and 6B, when the front end 44 of the strut 40 is secured to the chassis 20, the second flange 60 of the strut 40 is engaged with a second drive holder 164 holding the CD-ROM drive 160. At this time, the projections 62 of the second flange 60 are inserted into and engaged with the holes 162 of the second drive holder 164. Due to this engagement, the second drive holder 164 can be prevented from being moved upward, to the front and rear and to the right and left.

Figure 4C:
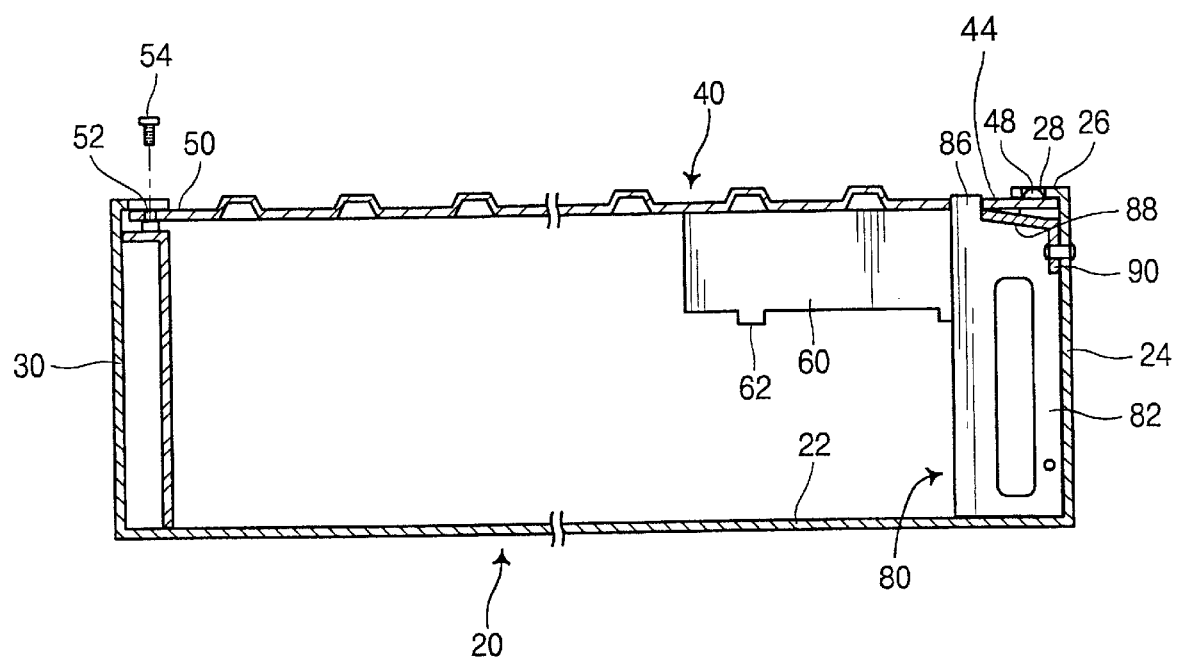
Figure 7A:
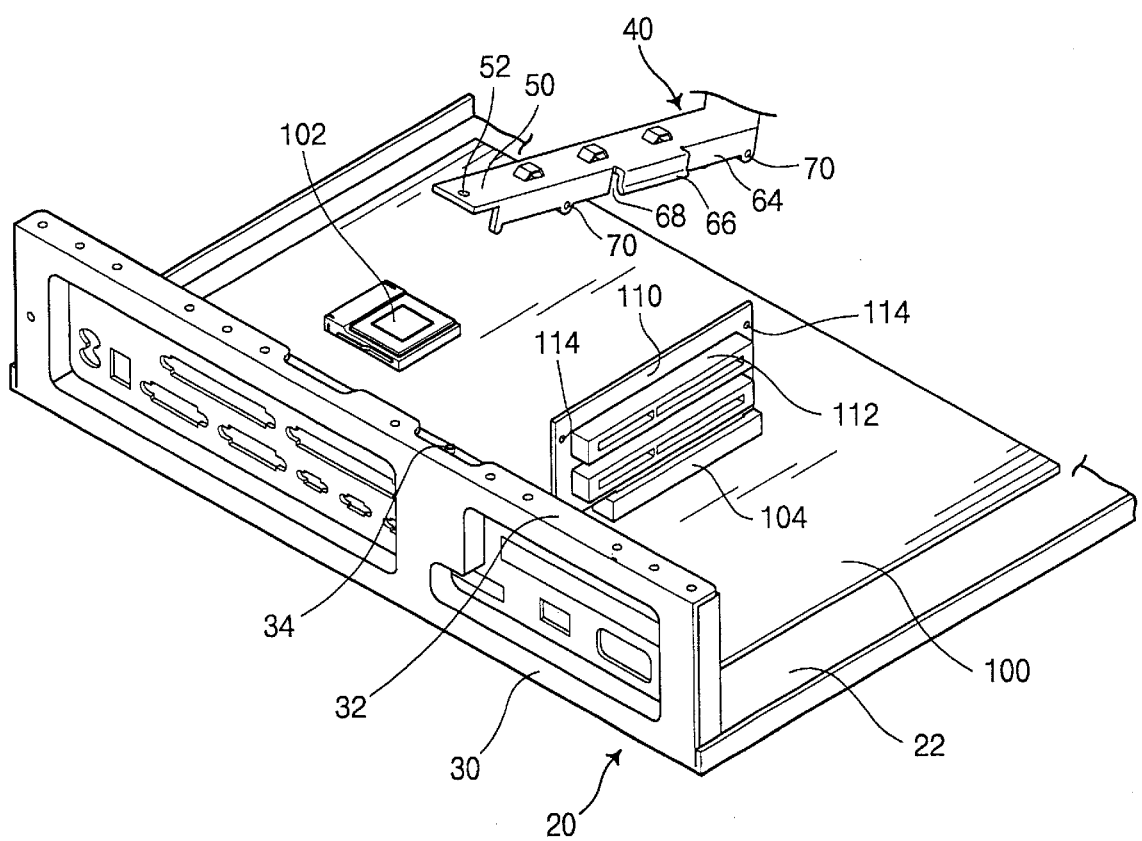
FIGS. 7A and 7B are perspective views showing a process in which the strut is engaged with a riser card.
Figure 7B:
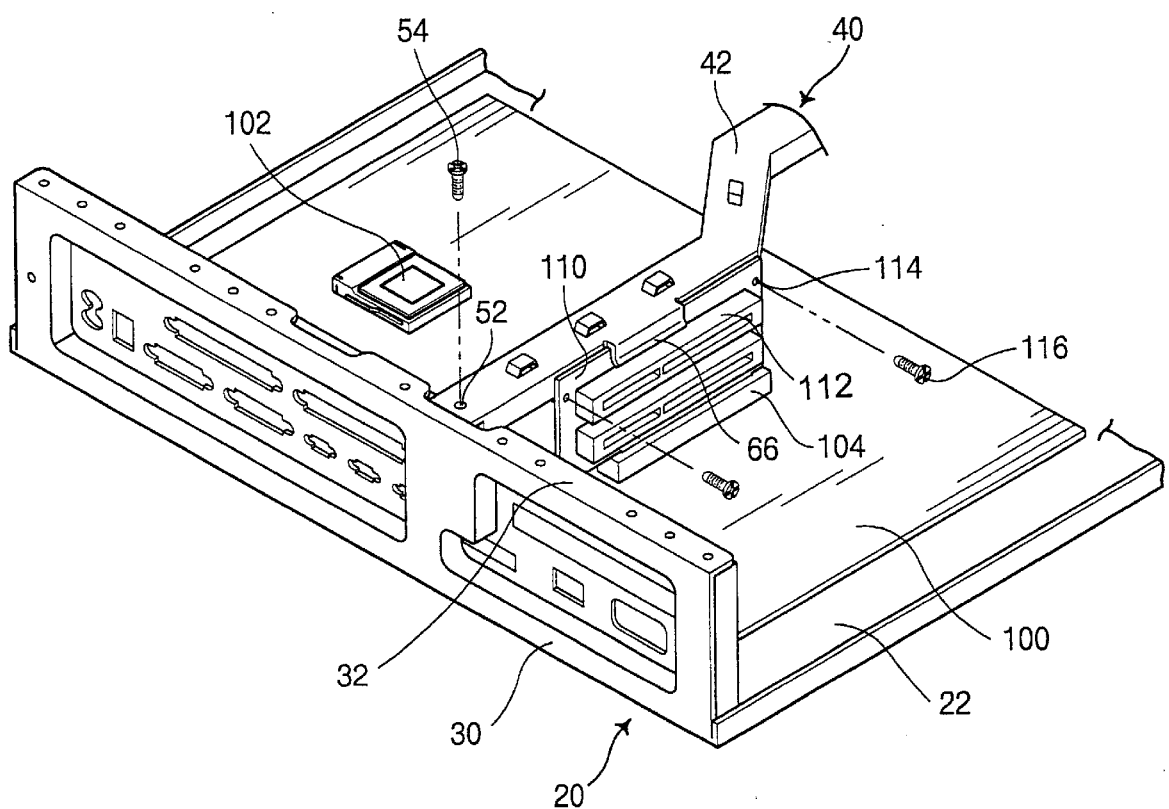

In the process in which the front end 44 of the strut 40 is secured to the front plate 24 of the chassis 20 and the rear end 50 of the strut 40 is secured to the rear plate 30 as shown in FIG. 4C, the riser card 110 is inserted into the channel 68 of the clip 66 of the strut 40 as seen in FIG. 7B. At this time, the hole 52 formed on the rear end 50 of the strut 40 is positioned on the top surface of the insert 34 that has been inserted to the rear flange 32 of the chassis 20. The strut 40 is fastened to the insert 34 by tightening the screw 54 into the hole of the insert 34 through the hole 52 of the rear end 50, thus being fastened to the chassis 20. If necessary, the riser card 110 may be fastened to the third flange 64 of the strut 40 using screws 116 through holes 114. Due to the retaining of the riser card 110 by the strut 40, the riser card 110 is prevented from being damaged by external impact or vibration.

As described above, the present invention provides a structure for mounting electronic devices to a main body of a computer that is capable of reducing the number of the parts for mounting the electronic devices to the main body securely because the electronic devices can be mounted to the chassis securely.

Additionally, the present invention is capable of simplifying and facilitating the assembly of the main body of a computer because the number of the parts for mounting the electronic devices can be reduced and the strut can be mounted to the chassis after the other electronic devices are mounted to the chassis, thus facilitating the supply and management of the parts and reducing the manufacturing cost of the computer. Further, the present invention is capable of preventing electronic cards from being damaged during the handling and conveyance of the computer because the electronic cards can be securely retained by the strut.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A structure for mounting electronic devices in a main body of a computer, comprising:
   a chassis having a first vertical plate, a second vertical plate and a bottom connecting the first and second vertical plates to each other;
   a first device holder being positioned in said chassis and adjacent to the first vertical plate;
   a second device holder being positioned in said chassis, said second device holder adjacent to the first vertical plate and parallel with said first device holder; and
   a strut traversing over said chassis and being engaged with and retaining said first and second device holders with first end of said strut secured to said first vertical plate and a second end of said strut secured to said second vertical plate.

2. The structure of claim 1, further comprising a bracket being secured to the first vertical plate between said first and second device holders, said bracket supporting said strut by being positioned below said strut.

3. The structure of claim 1, with said chassis being open on a top side, said strut secured to centers of top portions of said first and second vertical plates of said chassis, said strut extended parallel to a top side of said chassis.

4. The structure of claim 1, further comprising:
   a riser socket being mounted to a computer mother board secured to the bottom of said chassis; and
   a riser card being inserted to said riser socket, said strut engaging and retaining said riser card when said strut is secured to said first and second vertical plates.

5. A structure for mounting electronic devices in a main body of a computer, comprising:
- a chassis having a first vertical plate, a second vertical plate and a bottom connecting the first and second vertical plates to each other;
- a first device holder being positioned in said chassis and adjacent to the first vertical plate;
- a second device holder being positioned in said chassis, said second device holder adjacent to the first vertical plate and parallel with said first device holder;
- a strut having a first end secured to said first vertical plate and a second end secured to said second vertical plate, said strut traversing over said chassis and being engaged with and retaining said first and second device holders;
- a riser socket being mounted to a computer mother board secured to the bottom of said chassis;
- a riser card being inserted to said riser socket, said strut secured to a top portion of said riser card; and
- a clip formed on one side of said strut, a channel formed between said clip and said strut, said riser card being retained by said clip within the channel.

6. The structure of claim 5, with said strut being provided with a first hole on each side of said clip and said riser card being provided with second holes corresponding to the first holes of said strut, screws fastening said riser to said strut through the first holes and second holes.

7. A structure for mounting electronic devices in a main body of a computer, comprising:
- a chassis having a first vertical plate, a second vertical plate and a bottom connecting the first and second vertical plates to each other;
- a first device holder being positioned in said chassis and adjacent to the first vertical plate;
- a second device holder being positioned in said chassis, said second device holder adjacent to the first vertical plate and parallel with said first device holder; and
- a strut having a first end secured to said first vertical plate and a second end secured to said second vertical plate, said strut traversing over said chassis and being engaged with and retaining said first and second device holders; and
- a bracket being secured to the first vertical plate between said first and second device holders, said bracket supporting said strut by being positioned below said strut,
- with said first vertical plate being provided with a first flange extended horizontally and inwardly from a top edge of said first vertical plate and provided with third holes, said bracket being provided with a projection, a first end of said strut having projections inserted into the third holes of the first flange and a fourth hole of said strut engaged with the projection of said bracket.

8. The structure of claim 7, with said second vertical plate being provided with a second flange extended horizontally and inwardly from a top edge of said second vertical plate and provided with fifth holes, and a second end of said strut secured to said second flange being provided with sixth holes corresponding to the fifth holes of said second flange.

9. The structure of claim 8, with said first device holder holding a hard disk drive and a floppy disk drive, the hard disk drive and floppy disk drive accommodating a reading and writing of stored data.

10. The structure of claim 8, with said second device holder holding a Compact Disc drive, the Compact Disc drive accommodating a storage of data.

11. The structure of claim 10, with said strut having a front portion, a rear portion, and an intermediate portion connecting said front and rear portion, said intermediate portion bent with respect to said front and rear portion, said intermediate portion accommodating said front end to secure said first and second drive holders and said rear portion securing said riser card.

12. The structure of claim 11, with said first device holder having a projection engaged with a recess of a first flange of said strut, said second device holder having seventh holes engaged with projections of a second flange of said strut.

13. An apparatus, comprising:
- a chassis of a main body of a computer having a front vertical plate, a rear vertical plate, and a bottom connecting said front and rear vertical plates, said front plate having a horizontally formed front flange with a first hole, said rear vertical plate having a horizontally formed rear flange having an insert with a second hole, said bottom accommodating a motherboard;
- a riser card inserted into a riser card socket formed on the motherboard, said riser card having a third hole on opposite sides of said riser card;
- a first device holder positioned on one side of said chassis and having a projection;
- a second device holder positioned on a second side of said chassis and parallel with said first device holder, said second device holder having a fourth hole;
- a strut having a front end secured to said front vertical plate and a rear end secured to said second rear plate, said strut traversing over said chassis and being engaged with and retaining said first and second device holders, an intermediate portion connecting said front and rear end, said front end having a fifth hole and a projection inserted into the first hole of said front flange, a first flange downwardly extended from said front end, the first flange having a recess engaged with the projection of said first drive holder, a second flange downwardly extended from said front end on the other side of said first flange, said second flange having a projection inserted into and engaged with the fourth hole of said second device holder, the rear end having a downwardly extended third flange with two sixth holes formed on opposite sides of said third flange, a clip formed on a side of said strut having said third flange, a channel formed between said clip and said strut, a top portion of said riser card inserted into the channel engaging with said clip; and
- a bracket being secured to said front vertical plate supporting said strut, said bracket bent into a vertical portion and horizontal portion, a top edge of said vertical portion having a guide and a projection engaging with the fifth hole of said front end of said strut, the vertical portion having a fastening portion with a seventh hole secured to one side of an upper section of said front vertical plate by a fastener, the horizontal portion of said bracket resting on said bottom of said chassis, said strut secured between said bracket and said front flange of said chassis.

14. The apparatus of claim 13, with said first device holder supporting a hard disk drive and a floppy disk drive, said second device holder supporting a compact disc drive, the hard disk drive, floppy disk drive and compact disc drive accommodating storage of data.

15. A method, comprising the steps of:
- forming a chassis of a main body of a computer with a front vertical plate, a rear vertical plate, and a bottom connecting said front and rear vertical plates, said front plate having a horizontally formed front flange with a first hole, said rear vertical plate having a horizontally formed rear flange having an insert with a second hole, said bottom accommodating a motherboard;

inserting a riser card into a riser card socket formed on the mother board, said riser card having a third hole on opposite sides of said riser card;

positioning a first device holder adjacent to said front vertical plate of said chassis and having a projection; and engaging and retaining said first device holder, and said riser card with a strut, securing a front end of said strut to said front vertical plate and securing a rear end of said strut to said rear vertical plate, with said strut traversing over said chassis.

16. The method of claim 15, further comprising the step of positioning a second device holder adjacent to said front vertical plate and parallel with said first device holder, said second device holder having a fourth hole.

17. The method of claim 15, with said first device holder supporting a hard disk drive and a floppy disk drive, said second device holder supporting a compact disc drive, the hard disk drive, floppy disk drive and compact disc drive accommodating storage of data.

18. A method, comprising the steps of:

forming a chassis of a main body of a computer with a front vertical plate, a rear vertical plate, and a bottom connecting said front and rear vertical plates, said front plate having a horizontally formed front flange with a first hole, said rear vertical plate having a horizontally formed rear flange having an insert with a second hole, said bottom accommodating a mother board;

inserting a riser card into a riser card socket formed on the mother board, said riser card having a third hole on opposite sides of said riser card;

positioning a first device holder adjacent to said front vertical plate of said chassis and having a projection;

securing a front end of a strut to said front vertical plate and securing a rear end of said strut to said rear plate, said strut traversing over said chassis and being engaged with and retaining said first and second device holders;

positioning a second device holder adjacent to said front vertical plate and parallel with said first device holder, said second device holder having a fourth hole; and forming an intermediate portion of said strut connecting said front and rear end, said intermediate portion bent with respect to said front and rear portion, said intermediate portion accommodating said front end to secure said first and second drive holders and said rear end of said strut securing said riser card.

19. The method of claim 18, further comprising the steps of:

inserting a projection of the said front end of said strut into the first hole of said front flange of said front plate;

forming a fifth hole on said front end;

extending downwardly a first flange from said front end; and engaging a recess of said first flange with the projection of said first drive holder.

20. The method of claim 19, further comprising the steps of:

extending downwardly a second flange from said front end, said second flange being on the other side of said first flange;

inserting a projection of said second flange into and engaging with the fourth hole of said second device holder.

downwardly extending a third flange from said rear end of said strut;

forming a sixth hole on both sides of said third flange;

forming a clip on a side of said strut having said third flange, a channel formed between said clip and said strut; and engaging said riser card with said clip by inserting a top portion of said riser card into the channel.

21. The method of claim 20, further comprising the step of securing a bracket to said front vertical plate supporting said strut, said bracket bent into a vertical portion and horizontal portion, a top edge of said vertical portion having a guide and a projection engaging with the fifth hole of said front end of said strut, said vertical portion having a fastening portion with a seventh hole secured to one side of an upper section of said front vertical plate by a fastener, said horizontal portion of said bracket resting on said bottom of said chassis, said strut secured between said bracket and said front flange of said chassis.

* * * * *